United States Patent
Eddy et al.

(10) Patent No.: US 9,272,214 B2
(45) Date of Patent: *Mar. 1, 2016

(54) CONSOLIDATING BUSINESSES IN A GAMESPACE FOR AN ONLINE GAME

(71) Applicant: Zynga, Inc., San Francisco, CA (US)

(72) Inventors: Brian Eddy, Addison, IL (US); Daniel Marks, Decatur, GA (US)

(73) Assignee: Zynga Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/247,195

(22) Filed: Apr. 7, 2014

(65) Prior Publication Data
US 2014/0221101 A1    Aug. 7, 2014

Related U.S. Application Data

(63) Continuation of application No. 13/532,774, filed on Jun. 25, 2012, now Pat. No. 8,708,790.

(51) Int. Cl.
| | |
|---|---|
| *A63F 9/24* | (2006.01) |
| *A63F 13/00* | (2014.01) |
| *A63F 13/30* | (2014.01) |
| *A63F 13/63* | (2014.01) |
| *A63F 13/69* | (2014.01) |
| *A63F 13/822* | (2014.01) |
| *A63F 13/40* | (2014.01) |

(52) U.S. Cl.
CPC .......... *A63F 13/12* (2013.01); *A63F 13/10* (2013.01); *A63F 13/63* (2014.09); *A63F 13/69* (2014.09); *A63F 13/822* (2014.09); *A63F 2300/609* (2013.01); *A63F 2300/6615* (2013.01); *A63F 2300/6653* (2013.01); *A63F 2300/807* (2013.01)

(58) Field of Classification Search
None
See application file for complete search history.

(56) References Cited

U.S. PATENT DOCUMENTS

| | | | | |
|---|---|---|---|---|
| 5,638,502 | A * | 6/1997 | Murata | 345/634 |
| 6,270,416 | B1 * | 8/2001 | Komoto | 463/43 |
| 6,306,033 | B1 * | 10/2001 | Niwa et al. | 463/1 |
| 6,379,253 | B1 * | 4/2002 | Nishioka | 463/43 |
| 6,554,712 | B1 * | 4/2003 | Takahashi | 463/43 |
| 7,651,396 | B2 * | 1/2010 | Takahashi | 463/30 |
| 7,806,758 | B2 * | 10/2010 | Van Luchene | 463/1 |
| 8,151,198 | B2 * | 4/2012 | Everett et al. | 715/757 |
| 8,540,570 | B2 * | 9/2013 | Janis et al. | 463/31 |
| 8,708,790 | B2 * | 4/2014 | Eddy et al. | 463/9 |

(Continued)

OTHER PUBLICATIONS

"Does anyone remember how to play the original Populous?" published Nov. 19, 2005. Source http://boards.straightdope.com/sdmb/archive/index.php/t-345650.html.*

(Continued)

*Primary Examiner* — Steven J Hylinski
(74) *Attorney, Agent, or Firm* — Martine Penilla Group, LLP

(57) ABSTRACT

Software receives a command from a player selecting one or more businesses from a game menu in an online game that is a builder-type game. The software then receives a command from the player identifying an empty location in a game space for the game. The software causes the one or more businesses to be displayed in the game space at the location and receives a command from the player selecting a plurality of displayed businesses. The software then receives a command from the player to consolidate the displayed businesses that were selected into a consolidated business and displays the consolidated business in the game space.

20 Claims, 2 Drawing Sheets

(56) References Cited

U.S. PATENT DOCUMENTS

| | | | |
|---|---|---|---|
| 2004/0259614 A1* | 12/2004 | Machida | 463/1 |
| 2010/0062850 A1* | 3/2010 | Uchibori et al. | 463/31 |
| 2011/0107239 A1* | 5/2011 | Adoni et al. | 715/757 |
| 2012/0238361 A1* | 9/2012 | Janis et al. | 463/31 |
| 2012/0238362 A1* | 9/2012 | Janis et al. | 463/31 |

OTHER PUBLICATIONS

"Populous (Game)—Giant Bomb", accessed Dec. 9, 2013, describing a game released in 1989. Source http://www.giantbomb.com/populous/3030-6210.*

* cited by examiner

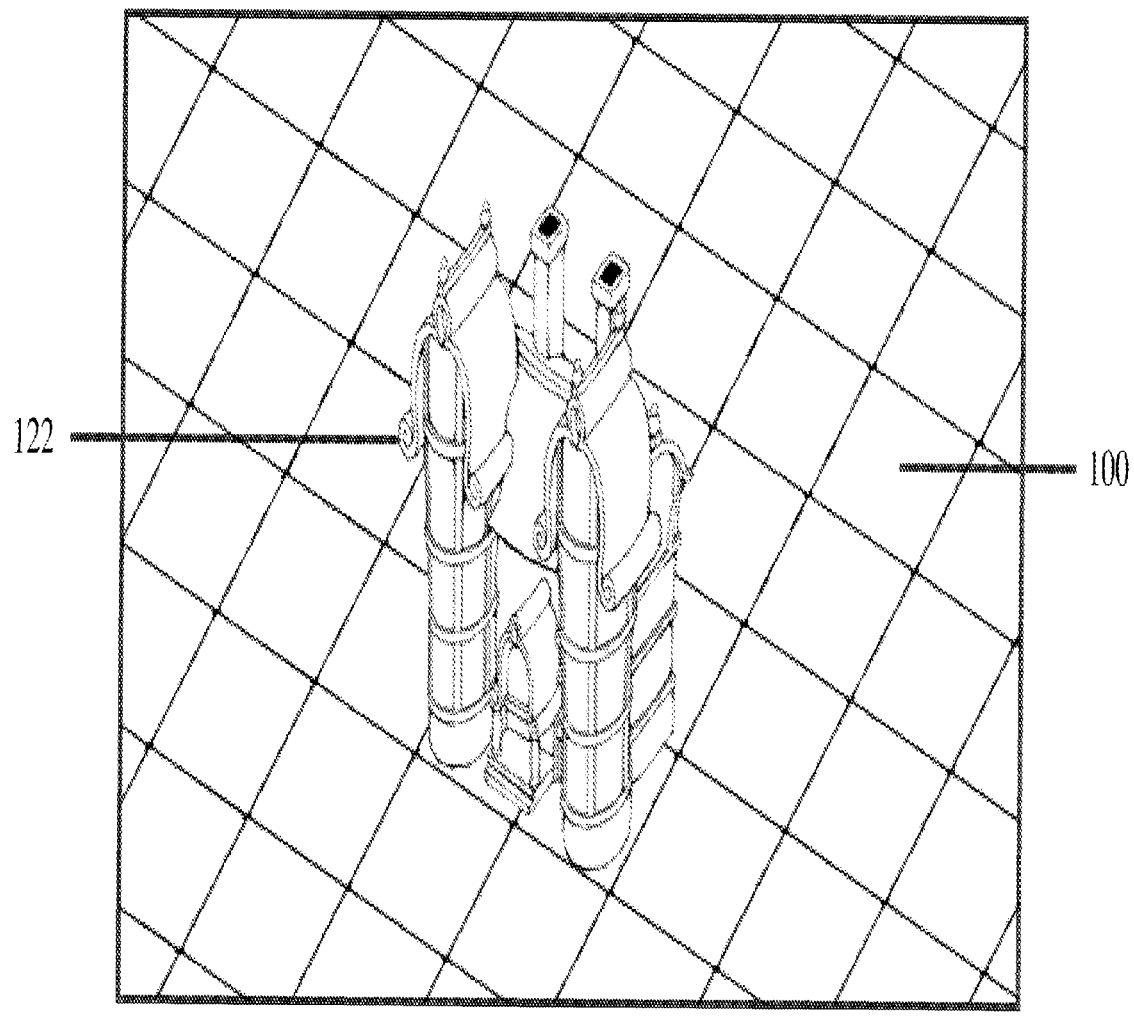
Consolidated Objects　　　FIGURE 2　　　Eddy, et al

CONSOLIDATING BUSINESSES IN A GAMESPACE FOR AN ONLINE GAME

RELATED APPLICATION

This application claims priority to and is a continuation application of U.S. patent application Ser. No. 13/532,774, filed on Jun. 25, 2012, entitled "Method of Operating an Online Game Using Consolidated Game Objects". The disclosure of that application is incorporated herein by reference for all purposes.

FIELD OF THE INVENTION

The present invention relates to methods of operating an online game and, more specifically, to an online game in which players consolidate multiple game objects into a single game object.

BACKGROUND OF THE INVENTION

Computer games have grown from simple single-player, text-based games playable on stand-alone desktop computers to massive multi-player games using high-resolution graphics playable across global networks.

The newest and most popular computer games allow members of online social networks to play games in which they build their own virtual worlds and share them with each other. For example, an online social network called Facebook offers such builder-type online social games to over 900 million members, such as Zynga's Cityville, LOLapp's Ravenswood Fair, and Digital Chocolate's Millionaire City.

In builder-type online games, players build their virtual worlds by placing game objects into a game space. For example, in a city-builder game buildings must be placed within the defined borders of the city. Over time, the game may grow crowded with game objects. For example, a densely populated city may contain dozens if not hundreds of buildings.

Crowded game spaces may reduce game performance as the network tries to transmit data and the computer struggles to display all of the game objects. Players may also become frustrated with the lack of available game space to place more game objects. Moreover, the sheer number of game objects may make the game space difficult or impossible to comprehend.

The issues related to crowded game spaces are often magnified by the addition of more game space. Initially, the additional game space allows players to spread out existing game objects and add new ones. Over time, however, the expanded game space fills up again and suffers from all of the prior issues on a larger scale.

Thus, there is a need for methods of playing builder-type online games wherein players continue to build their virtual worlds without crowding the game space with game objects.

SUMMARY

The present invention provides methods for playing a multi-player, online game in which players build virtual worlds by placing game objects into a game space and may consolidate multiple game objects into a single object such that the new consolidated object maintains some or all of the features of the original, separate objects but occupies less game space.

BRIEF DESCRIPTION OF THE DRAWINGS

FIG. 2 illustrates an example of one consolidated game object in a game space.

DETAILED DESCRIPTION

Figure 1:
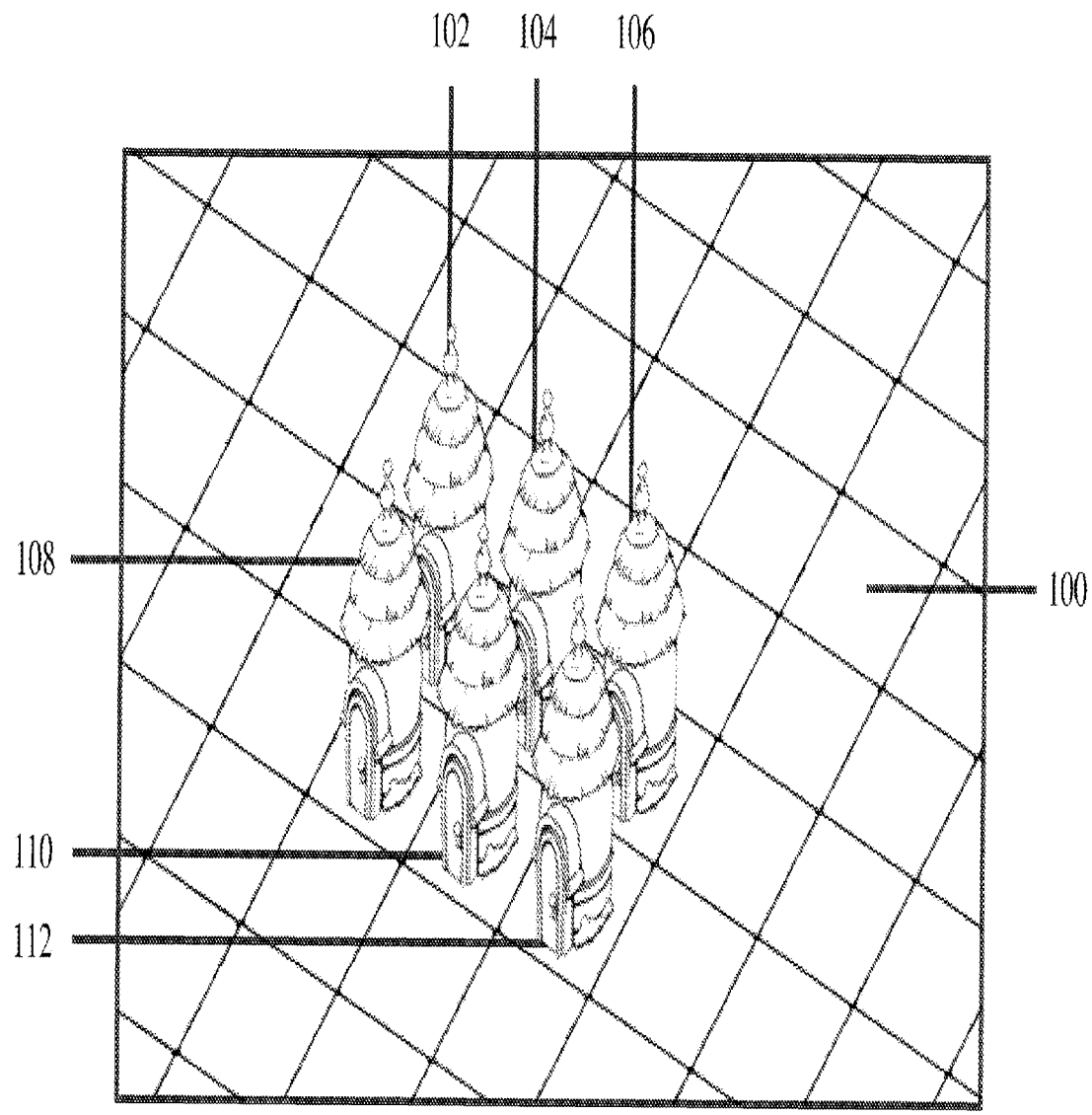
FIG. 1 illustrates an example of six game objects placed into a game space.

In a preferred embodiment, a player pays a predetermined price to consolidate multiple game objects into a single game object such that the new consolidated object provides all the in-game benefits of the original, separate objects but occupies less game space. For example, a player pays 10 credits to consolidate 4 businesses that occupy 16 game spaces into a single mixed-use facility that produces the same in-game benefits as the original 4 businesses but fits into 6 game spaces.

Alternatively, a preferred embodiment requires consolidation of game objects from the same family type. For example, a player may only consolidate businesses of any type with other businesses of any type.

In a further embodiment, consolidation only occurs between the game objects of the same sub-family type. For example, a player may only consolidate food stores with other food stores and apartment buildings with other apartment buildings.

In a further embodiment, consolidation only occurs between predetermined subset of game objects. For example, a player may only consolidate game objects marked with a special "consolidate" icon.

In a further embodiment, consolidation does not require any payment but rather the completion of predetermined game actions. For example, a player may only consolidate game objects upon achieving a predetermined level of experience within the game.

In a further embodiment, consolidation requires a combination of payment and predetermined game actions. For example, a player may only consolidate game objects upon paying a predetermined amount and achieving a predetermined level of experience within the game.

In a further embodiment, consolidation results in a single object with all of the features and benefits of the original, separate objects. For example, a player may combine four apartment buildings that each house 50 people to create a consolidated apartment building that holds 200 people.

In a further embodiment, consolidation results in a single object with some of the features and benefits of the original, separate objects. For example, a player may combine 4 apartment buildings that each house 50 people to create a consolidated apartment building that holds 160 people.

In a further embodiment, consolidation results in a single object with features and benefits greater than the original, separate objects. For example, a player may combine 4 apartment buildings that each house 50 people to create a consolidated apartment building that holds 300 people.

In a further embodiment, consolidation results in a single object with features and benefits different from the original, separate objects. For example, a player may combine 4 businesses that each produce 50 pairs of shoes to create a consolidated business that produces 200 pairs of boots.

In a further embodiment, consolidation results in a single object that fits into a predetermined game space relative to the number and size of the original, separate objects. For example, a player may combine 4 buildings that each occupy 4 game spaces to create a consolidated building that occupies 75% of the original objects, or 12 game spaces.

In a further embodiment, consolidation results in a single object that fits into a predetermined game space without regard to the number or size of the original, separate objects. For example, a player may combine any number of buildings that each occupy any number of game spaces to create a consolidated building that always occupies 6 game spaces.

In a further embodiment, consolidation results in an award. For example, a player may collect an award based upon the number of game objects consolidated, the number of game spaces used by the original objects, the type of game objects consolidated, and/or any other predetermined or random factor.

In a further embodiment, consolidation occurs at the discretion of the player. For example, a player may decide when and where to consolidate objects in their game space without regard to any external rules or restrictions.

In a further embodiment, consolidation occurs automatically upon the occurrence of predetermined criteria. For example, multiple game objects may be automatically consolidated once a game space in more than 90% occupied.

In a further embodiment, additional game objects may be added to an already consolidated game object. For example, a player may add 2 more buildings to a game object formed by the prior consolidation of 4 buildings.

In a further embodiment, game objects located anywhere in game space may be consolidated. For example, a player may combine city buildings located anywhere within the city borders.

In a further embodiment, game objects must be located in predetermined locations relative to each other or the game space to be consolidated. For example, a player may only consolidate buildings located adjacent to each other within the city borders.

In a further embodiment, game objects may be consolidated across multiple game spaces. For example, two players may consolidate buildings located in each of their game spaces into a single building.

In a further embodiment, game objects consolidated across multiple game spaces may appear in any or all of these game spaces. Moreover, these multi-game space consolidated objects may offer additional benefits or features depending on the number of game-spaces contributing game objects.

In a further embodiment, additional game objects may be added by new players to an already consolidated game formed by other players. For example, a fifth player may add a building to a game object formed by the prior consolidation of buildings from each of 4 other players' game spaces.

In a further embodiment, consolidation occurs in games playable across the Internet. For example, members of the Facebook online social network may access games via the Internet in which they may consolidate game objects.

In a further embodiment, consolidation occurs in games playable on any network or platform that supports electronic data transfer. For example, owners of cellular phones may access games via the cellular data network in which they may consolidate game objects.

In a preferred embodiment of the present invention, a player builds a virtual world comprised of game objects placed into a game space. At any point, the player consolidate any two or more of the same type of object into a single object which maintains all of the same features and benefits of the original, individual game objects but occupies less game space.

FIG. 1 shows a game space 100 divided into a grid with equal sections and presented in an isometric view. The game space 100 contains six small housing units 102-112 with each housing unit occupying 1 grid spaces by 1.0 grid spaces for a total of 6 grid occupied spaces. A small housing unit provides shelter for 4 inhabitants and, therefore, the 6 small housing units 102-112 combine to provide shelter for 24 inhabitants of the player's virtual world.

To place the small housing units 102-112 into the game space 100, the player used a mouse (not shown) to control an arrow indicator (not shown) to select housing units from a game menu (not shown). Once selected, the small housing units can be positioned into any suitable empty positions in the game space 100 by clicking on the desired location with the mouse (not shown). In FIG. 1, all of the small housing units 102-112 have been positioned adjacent to each other. Alternatively, the small housing units 102-112 could have been selected and placed in any suitable manner and positioned in any location in the game space 100.

FIG. 2 shows the game space 100 with all of the same features as FIG. 1 except for the consolidation of all six small housing units 102-112. The game space now only contains the one large housing unit 122 which occupies 2.3 grid spaces by 2 grid spaces for a total occupied area of 4 grid spaces. The large housing unit 122 provides the same benefit as all six of the small housing units 102-112 by providing shelter for 24 inhabitants of the player's virtual world. Moreover, the large housing unit 122 occupies 66.67% of the game space occupied by the six small housing units 102-112.

To consolidate the small housing units 102-112, the player used a mouse (not shown) to control an arrow indicator (not shown) to select the small housing units 102-112 on the game space 100 and then again used the mouse to select the consolidation option from a game menu (not shown). Alternatively, any input device and/or indicator may be used to control game functions, such as selection of game objects for consolidation.

Following consolidation, the large housing unit 122 can be positioned into any suitable empty positions in the game space 100. In FIG. 2, the large housing unit 122 has been positioned in the approximate location as the pre-consolidated small housing units 102-112 were located in FIG. 1. Alternatively, the large housing unit 122 could have been placed in any suitable manner and positioned in any location in the game space 100.

Network & Systems

The present invention may be implemented on computer-based networks using systems comprised of interconnected client and server devices. In a preferred embodiment, server and client devices operate across the Internet using one or more of the following networks: wired, wireless, satellite, and cellular communication. Client devices are connected to the networks via a network service provider or wireless carrier; servers are connected to the networks via modems, routers and/or networking switches.

Clients. A client device is generally computer-based equipment such as a desktop computer, laptop computer, computer tablet, personal digital assistant, mobile phone, smart phone, mobile gaming device, interactive television, and/or console game system that is managed and controlled by an operating system, such as LINUX, UNIX, Microsoft Windows, Apple Macintosh, and/or other proprietary or open source operating system.

To facilitate communication with a network, a client device includes a network interface, such as an Ethernet (IEEE 802.3), Wi-Fi (802.11), or Wi-Max (802.16). In addition, a client device may also include, but not be limited to, a central processing unit (CPU), system memory (DRAM), video memory, video display, hard drive, I/O ports, and/or keyboard.

A client device may execute one or more applications, such as a web browser (e.g., Microsoft Internet Explorer, Google Chrome, Mozilla Firefox, and Apple Safari) and plug-ins, languages, or other extensions (e.g., Flash Media Player, Unity 3D, AJAX, XML, HTML, JavaScript), to perform game-related functions and/or access data from the servers available via one or more networks.

Servers. Servers are computing devices that execute applications using languages such as PHP, ASP, C#, C, C++, CGI, PERL, XML, Java, JSP, SQL, PYTHON, and RUBY. Similar to client devices, servers must communicate with a network via a network interface, such as an Ethernet (IEEE 802.3), Wi-Fi (802.11), or Wi-Max (802.16). In addition, a server device may also include, but not be limited to, a central processing unit (CPU), system memory (DRAM), video memory, video display, hard drive, I/O ports, and/or keyboard.

Servers also store digital data as data files or records and, in many cases, organize the digital data into a variety of databases, such as relational and object-oriented databases. A database is logical framework that allows files and records to be created, accessed, edited, and/or deleted with maximum accuracy and speed. Digital data may take many forms, including: text, numbers, 2D and 3D images, graphics, animations, audio, video, and/or other media.

Scope & Spirit of the Present Invention

The many features and advantages of the present invention are apparent from the foregoing descriptions of the preferred embodiments. The present invention, however, is not limited to these particular embodiments, as the invention is capable of being practiced and carried out in various ways. For example, new features may be added to an existing embodiment or features from two or more embodiments may be combined to produce a new embodiment. Further, features mentioned in any embodiment may be interchanged with similar features not mentioned that perform the same or similar functions. And, finally, the phraseology and terminology used to explain the embodiments are only descriptive and should not be regarded as limiting. The claims, therefore, seek to cover all features and advantages that fall within the true spirit and scope of the present invention.

Copyright Notice

A portion of this application may contain materials subject to copyright protection. The copyright owner has no objection to the reproduction of this material in the same form as filed with the U.S. Patent and Trademark Office, but all other copyright rights are reserved.

What is claimed:

1. A method, comprising operations of:
   receiving a command from a player selecting one or more businesses from a game menu in an online game that is a builder-type game, wherein the game menu is a control in a graphical user interface (GUI) presented on a display device by a programmed computer configured to display the GUI and to receive commands from an input device operated in conjunction with the GUI;
   receiving a command from the player identifying an empty location in a game space for the game, wherein the game space is a view in the GUI;
   causing the one or more businesses to be displayed in the game space at the location;
   receiving a command from the player selecting a plurality of displayed businesses;
   receiving a command from the player to consolidate the displayed businesses that were selected into a consolidated business; and
   displaying the consolidated business in the game space.

2. The method of claim 1, wherein the game allows consolidation of a business of one type with a business of another type.

3. The method of claim 1, wherein the game allows consolidation only if the displayed businesses that were selected are of the same sub-family type.

4. The method of claim 1, wherein the game allows consolidation only after a completion of a predetermined game action by the player.

5. The method of claim 1, wherein the game allows consolidation only after a completion of a predetermined level of experience by the player.

6. The method of claim 1, wherein the player pays a pre-determined price for the consolidation.

7. The method of claim 1, wherein the game allows consolidation only after a completion of a predetermined game action by the player and payment of a pre-determined price by the player.

8. The method of claim 1, wherein the displayed consolidated business occupies less space than the displayed businesses that were consolidated.

9. The method of claim 1, wherein another player can add a business to the consolidated business.

10. One or more computer-readable media persistently storing a program, wherein the program, when executed, performs the following operations:
    receive a command from a player selecting one or more businesses from a game menu in an online game that is a builder-type game, wherein the game menu is a control in a graphical user interface (GUI) presented on a display device by a programmed computer configured to display the GUI and to receive commands from an input device operated in conjunction with the GUI;
    receive a command from the player identifying an empty location in a game space for the game, wherein the game space is a view in the GUI;
    cause the one or more businesses to be displayed in the game space at the location;
    receive a command from the player selecting a plurality of displayed businesses;
    receive a command from the player to consolidate the displayed businesses that were selected into a consolidated business; and
    display the consolidated business in the game space.

11. The computer-readable media of claim 10, wherein the game allows consolidation of a business of one type with a business of another type.

12. The computer-readable media of claim 10, wherein the game allows consolidation only if the displayed businesses that were selected are of the same sub-family type.

13. The computer-readable media of claim 10, wherein the game allows consolidation only after a completion of a pre-determined game action by the player.

14. The computer-readable media of claim 10, wherein the game allows consolidation only after a completion of a pre-determined level of experience by the player.

15. The computer-readable media of claim 10, wherein the player pays a predetermined price for the consolidation.

16. The computer-readable media of claim 10, wherein the game allows consolidation only after a completion of a pre-determined game action by the player and payment of a pre-determined price by the player.

17. The computer-readable media of claim 10, wherein the displayed consolidated business occupies less space than the displayed businesses that were consolidated.

18. The computer-readable media of claim 10, wherein another player can add a business to the consolidated business.

19. A method, comprising operations of:
- receiving a command from a player selecting one or more businesses from a game menu in an online game that is a builder-type game, wherein the game menu is a control in a graphical user interface (GUI) presented on a display device by a programmed computer configured to display the GUI and to receive commands from an input device operated in conjunction with the GUI;
- receiving a command from the player identifying an empty location in a game space for the game, wherein the game space is a view in the GUI;
- causing the one or more businesses to be displayed in the game space at the location;
- receiving a command from the player selecting a plurality of displayed businesses;
- receiving a command from the player to consolidate the displayed businesses that were selected into a consolidated business, wherein the game allows consolidation of a business of one type with a business of another type; and
- displaying the consolidated business in the game space, wherein the displayed consolidated business occupies less space than the displayed businesses that were consolidated.

20. The method of claim 19, wherein the player pays a predetermined price for the consolidation.

* * * * *